Sept. 16, 1952     R. A. BRAUNBERGER     2,610,862
FIFTH WHEEL LOCKING MEANS

Filed Nov. 17, 1948     4 Sheets-Sheet 1

INVENTOR.
RAY. A. BRAUNBERGER
BY
ATTORNEY

Sept. 16, 1952   R. A. BRAUNBERGER   2,610,862
FIFTH WHEEL LOCKING MEANS

Filed Nov. 17, 1948   4 Sheets-Sheet 2

INVENTOR.
RAY. A. BRAUNBERGER
BY Bruno C. Lechler
ATTORNEY

Sept. 16, 1952 — R. A. BRAUNBERGER — 2,610,862
FIFTH WHEEL LOCKING MEANS
Filed Nov. 17, 1948 — 4 Sheets-Sheet 3

INVENTOR.
RAY A. BRAUNBERGER
BY Bruno C. Lechler
ATTORNEY

UNITED STATES PATENT OFFICE 2,610,862

FIFTH WHEEL LOCKING MEANS

Ray A. Braunberger, Chicago, Ill.

Application November 17, 1948, Serial No. 60,575

14 Claims. (Cl. 280—33.05)

The invention relates to an improved fifth wheel for coupling tractors to semi-trailers.

When a tractor carrying a fifth wheel assembly is backed under the front end of a semi-trailer the king pin projecting down from the under side of the semi-trailer forcibly aligns the front end of the semi-trailer and the center line of the tractor and when the king pin reaches coupling position the parts of the fifth wheel are subjected to severe shock.

Once the king pin has reached the center of the fifth wheel it must be positively locked against release. The entire pull of the tractor on the trailer must be transmitted through this lock. It must remain dependably locked despite jolts and side sway.

The lock must not only prevent the king pin from moving horizontally out of place but also from jumping vertically out of the top plate. King pins have necks adapted to be engaged by an element carried by the fifth wheel. This prevents relative vertical movement of the king pin and the fifth wheel. To permit interchangeability tractors and semi-trailers, the proportions of the king pins have become standardized in the industry. As the loads carried by the semi-trailers have continually become larger the movable neck-encircling locking elements generally used have to be increased in size. With the distance of the neck of the king pin below the top of the fifth wheel plate fixed by king pins standardized in the industry, it has become difficult to provide for this engagement with the neck without a machined top plate and a housing separate from that top plate but attached to it by bolts or the like, thus sacrificing the ruggedness inherent in an integral casting.

The invention permits using a housing integral with the cast top plate because the front half of the neck of the king pin is engaged by a horizontal flange cast integral with the top plate and the rear half of the head of the king pin is engaged by locking mechanism moving in a vertical plane. The parts of the locking mechanism may be made heavier if needed without being limited by the standardized width of the neck.

Although the lock resists tremendous forces, it must be releasable without undue effort by the truck operator. This release mechanism permits the truck driver to move a lever on the fifth wheel confident that the lock will remain in releasing position while he mounts into the cab, and the tractor pulls out from under the semi trailer. When the tractor backs under a semi-trailer, the lock should snap into locked position. Hitherto it has been necessary to reset the release mechanism after the tractor has backed out from under the semi-trailer so that it will be ready to snap into locked position when the tractor backs under the next semi-trailer.

The invention provides automatic resetting means so that after the operator releases the latch to allow the tractor to draw out from under the load the parts remain in releasing position until the king pin is clear of the lock but in clearing the king pin automatically resets the release mechanism so that when the tractor backs under another semi-trailer, and the king pin enters the locking mechanism, it will snap into locked position without any preliminary setting by the driver.

One of the objects of the invention is to make a fifth wheel construction that is simple and rugged, well adapted to absorb shocks permitting a single casting for the fifth wheel plate and the housing for the locking mechanism to replace a large number of parts bolted together.

Another object of the invention is to provide a fifth wheel plate having an integral well containing locking mechanism that moves in a vertical plane to engage the head of the king pin and to hold its neck against a horizontal flange cast as part of the fifth wheel plate.

Another object of the invention is to arrange the locking mechanism so that it is housed in a narrow well on the underside of the fifth wheel plate which permits supporting the lock parts on relatively short shafts supported on both ends.

Another object is to lock the pin in position by a rocker arm that bears against the end flange of the pin rather than its neck.

Still another object of the invention is to provide a locking device which includes a rocker arm movable in a vertical plane, the engagement of the finger on the forward end of the rocker arm by the king pin moving the claw on the other end of the rocker arm into place to engage the king pin and also allowing a pawl pivoted on a horizontal axis to fall in under the rocker arm, preventing it from unlocking.

Another object of the invention is to provide a latch-releasing mechanism that moves the pawl out from under the rocker arm and holds it out from under.

Still another object is to provide a self resetting releasing means which permits moving the pawl out from under the rocker to a position where it is held by a latch. This latch is released by the rocker arm when it has been rocked to a position that prevents a spring from drawing a pawl back under the rocker arm, so that when the tractor is again backed under a semi-trailer causing the rocker arm to move to locking position, the pawl will be drawn in under the rocker arm to hold it locked without any further attention by the operator.

A further object is to provide a fifth wheel having a plate that is movable about two axes at right angles for each other—movement of one axis being checked by springs, and a manually actuated latch.

Figures 5, 6, 7, and 8 are all drawn to the same enlarged scale.

Fig. 6 is a side elevation of the chamber on the under side of the top plate taken along line 6—6 of Fig. 1, also drawn to an enlarged scale.

Fig. 7 is a vertical section taken essentially along the same plane as Fig. 5 but showing the parts latched in unlocking position which permits the tractor to which the fifth wheel is attached backing out from under the semi-trailer.

Fig. 8 is a vertical elevation similar to Fig. 7 showing the king pin about to engage the lock which has been readied for engagement.

Figure 1:
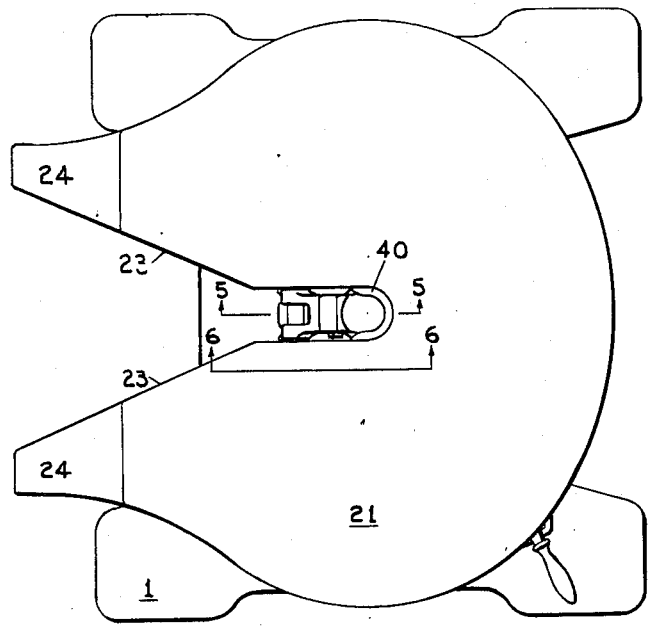
Fig. 1 is a plan view of a fifth-wheel assembly incorporating the invention.
Figure 2:
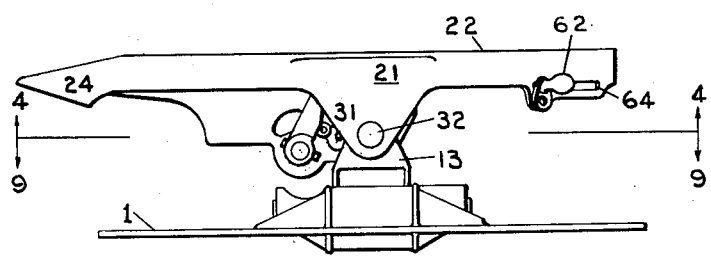
Fig. 2 is a side view elevation of the same assembly.
Figure 3:
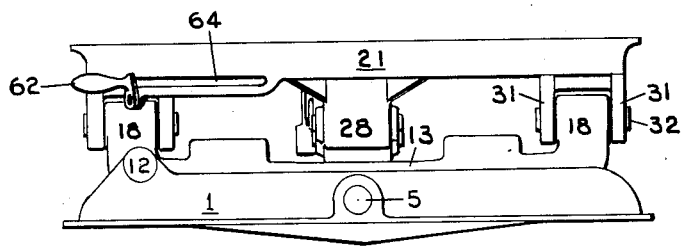
Fig. 3 is an end elevation of the same assembly.

1 is a cast base plate adapted to be attached to the chassis of a tractor (not shown) by fastenings extending through holes 2.

This base plate is reinforced by a number of cast ribs, two of which, 3, form a box-section that extends crosswise of the tractor chassis. Bosses 4 are cast on the plate and a short shaft 5 extends through these two bosses. Circular rims 6 cast on base plate 1 in the box section between the ribs 3 serve to locate heavy coil springs 7.

Another boss 8 located at one end of one of the ribs 3 is bored for locking pin 10 having a conical head. This pin has a threaded stem 11, engaging a thread in the boss and a knob 12. By turning the knob 12 the conical head of pin may be drawn back into the bore or made to project from the boss.

A sway member, generally indicated at 13, is adapted to be supported on shaft 5 with its ends free to rock up and down in the box section between ribs 3. The upper horizontal portion 14 of the sway member contains circular pockets 15 to locate the other ends of springs 7. Flanges 16 extend downward from each edge of portion 14. A conical hole 17 in one of these flanges 16 may be engaged by the conical head of the pin 10 when knob 12 is turned to project the pin 10 out from the boss 8. Thus the sway member may be allowed to rock about shaft 5, its motion cushioned by the compression of springs 7, or it may be held rigid relatively to base plate 1. The upwardly projecting ends 18 of the sway arm are bored at 20 to support the top plate generally indicated at 21.

Figure 4:
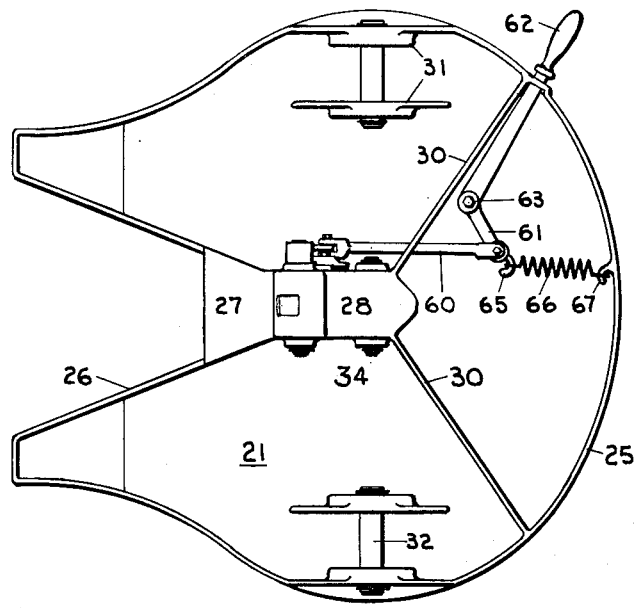
Fig. 4 is a view of the underside of the top plate and parts attached thereto taken along line 4—4 of Fig. 2.

The top plate has a plane top surface 22, generally circular as shown on Fig. 1 with a slot extending from one side to past the center of the plate. The outer edges 23 of this slot flare, and adjacent to the outer ends of the slot, the top surface slopes downward to form horns 24. As shown in Fig. 4, a flange 25 extends along the outer edges of the top plate. The flanges 26 extend along the outer edges of the slot in the top plate. A web 27 extends across the ends of these flanges as they approach the center of the top plate, forming a compact box-like housing 28 on the under side of the top plate.

This housing is further braced by ribs 30. Four flanges 31 depend from the top plate. Pins 32 extend thru each pair of flanges 31. These pins which pass thru holes 20 in the sway bar 13 support the top plate in a manner permitting universal adjustment for that plate. This results from the freedom of the top plate to swing about two axes normal to each other—shafts 5 and 32 forming these axes.

The sides of the box like housing are bored for two parallel shafts 33, 34,

The purpose of the universally adjustable top plate and its slot with flaring ends is to guide the king pin 35 depending from the sole plate 36 of a semi-trailer to the the center of the top plate in line with shafts 32. The king pins of all semi-trailers have heads 37 and a neck 38, the neck 38 always being a fixed distance below the plate 36. A semi-circular horizontally projecting flange 40 cast in the housing 28 engages the neck 38 of the king pin preventing it from being jolted vertically out of engagement with the top plate.

Flange 40, being integral with the top plate can transmit a larger upward pull than if it were not integral. Shaft 34 lies below the king pin when it is in its engaged position and this shaft carries a rocker arm generally indicated at 41. This rocker arm has finger 42 which is engaged by the head of the king pin to tilt the rocker arm into locked position shown in Fig. 5. The rocker arm carries a claw 43 shaped to bear against a substantial part of the head of the king pin. The weight of the claw 43 biases the rocker arm to the position shown in Fig. 8. When the rocker arm is in the position shown in Fig. 5 it will prevent the king pin and the top plate of the fifth wheel being separated by either horizontal or vertical movement. As pointed out, the flange 40 engaging the neck of the king pin has already prevented vertical separation. There is a definite advantage having the claw bear against the head, rather than the neck of the king pin. The diameter of king pins are standardized but as the load carried by semi-trailers increases the head 37 could be made larger.

While a lock that enters into the neck of the pin is limited in strength by the section which this permits, the rock arm 41 may be correspondingly increased in strength. The claw 43 has a convex cylindrical surface 44 whose axis is that of pin 34, and a concave cylindrical surface whose axis is that of shaft 33 when the parts are in the position shown in Fig. 5. The rocker arm has a projection 45 and a laterally projecting finger 46. A pawl 47 keyed to shaft 33 is shaped to bear against the convex surface 45 when the parts are in the position shown in Fig. 5. Examinations of the figures will show that an unusually rigid structure has been provided in which the entire pull of the tractor is transmitted to the closely spaced walls of the housing 28, and from there thru the short shaft 33 and thence thru pawl 47 and claw 43 to the head of the king pin.

Figure 5:
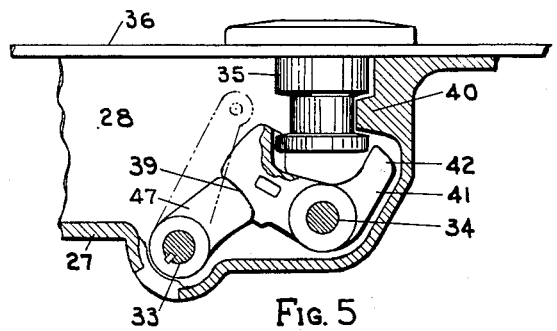
Fig. 5 is a vertical section taken along line 5—5 in Fig. 1, drawn to an enlarged scale.

The two shafts 33 and 34, the pawl 47 and the rocker arm 41, are all the parts that transmit the pull to the head of the king pin when the parts are in the locked position shown in Fig. 5.

An arm 50 having a hub 51 which has a cam surface 52 that has a radial step 53 is keyed to the outer end of shaft 33. The shaft 33 and the pawl carried thereby have three operative positions. One is the load-transmitting position with the king pin locked, shown in Fig. 5, where the pawl is under the rocker arm. Another is the "ready to fall in" position shown in Fig. 8 when the pawl lies against convex surface 44 of the claw ready to fall into the position shown in Fig. 5 as soon as the claw is elevated.

Figure 7:
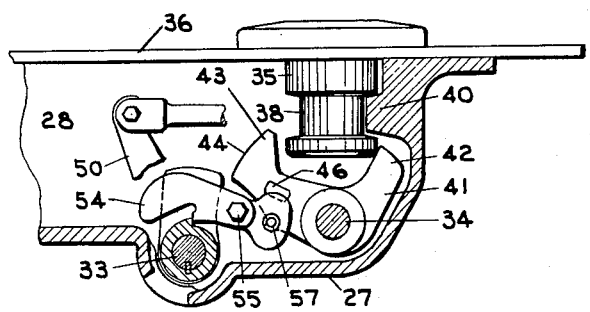

The third position is the "ready-to-release" position shown in Fig. 7 when the pawl is held over to the left and is out of contact with the rocker arm. This is preparatory to the disengagement of the king pin.

The shaft 33 is held in this third position by a lever 54 pivoted at 55 in the outside of housing 28. This lever carries a tail 56 having a finger 57 that projects through a slot in the housing 28 into the path of finger 46.

Figure 8:
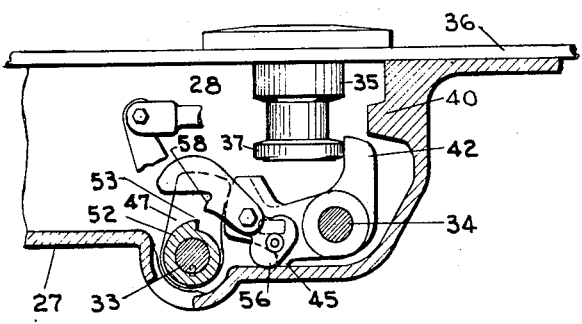
Figure 9:
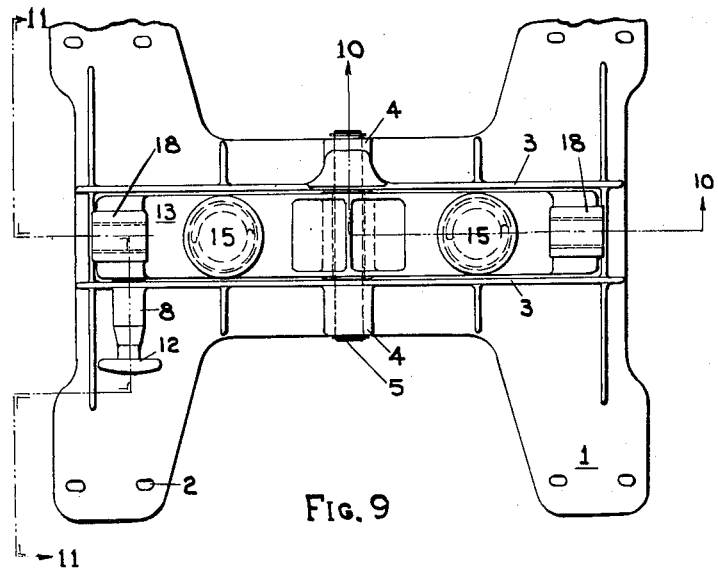
Fig. 9 is a plane view along line 9—9 of Fig. 2 showing the parts supporting the fifth wheel plate shown in Fig. 1 and is drawn to the same scale.
Figure 10:
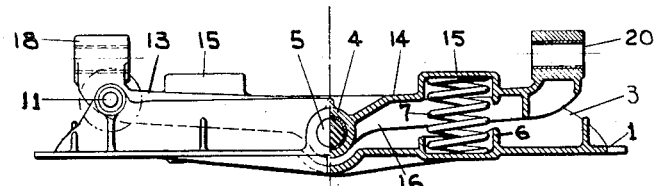
Fig. 10 is an elevation of the parts shown on Fig. 9, a portion of the parts having been cut away along line 10—10 in Fig. 9.
Figure 11:
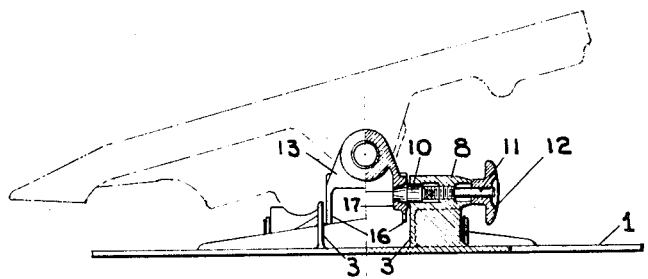
Fig. 11 is an end elevation partly in section taken along line 11—11 in Fig. 9.

In Fig. 8 the king pin stands still while the fifth wheel moves to the right in disengaging. It will be evident that when the tractor has carried the fifth wheel away from the king pin, the weight of claw 43 causes the rocker arm to tilt until projection 45 bears against the bottom of the housing as shown in Fig. 8. When in this position the finger 46 has engaged finger 57 and elevated the other end of the lever 54 so that the tooth 58 is out of contact with the face 53 of the cam 52.

Figure 6:
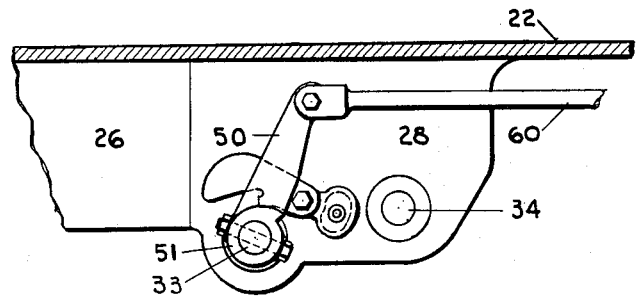

When the trailer is to be uncoupled, the driver seizes handle 62 and slides it along slot 64 in a clockwise direction as seen in Fig. 4. This movement stresses the spring 66 and moves the rod 60 to the left in Figs. 4, 6, 7, 8. The rod 60 rocks the arm 50 which is keyed to the shaft 33 counterclockwise in Figs. 6, 7 and 8. This movement of the shaft 33 carries the cam surface 52 which is keyed to it through the position shown in Fig. 7, where the lever 54 has dropped so that the tooth 58 engages the face 53 of the cam surface. This holds the pawl 47 in the position shown in Fig. 7. When the tractor now moves forward the kingpin 35 attached to the stationary semi-trailer strikes the claw 43 of the rocker arm 41 depressing it into the position shown in Fig. 8. As the rocker arm 41 is depressed, it prevents the pawl 47 from returning even if the lever 54 is elevated. The rocker arm 41 carries a finger 46 which engages a projection 45 on the rear end of the pivoted lever 54 and lifts the tooth 58 out of contact with the base 53. The spring 66 which has previously been stressed draws the pawl against the face 44 of the rocker arm 41 ready for the locking operation.

When the semi-trailer is recoupled, the kingpin 35 sliding into place strikes the forward finger 42 of the rocker arm 41 and this elevates the claw 43 back into the position shown in Fig. 7. The spring 66 now draws the pawl 47 in under the claw and the fifth wheel is in locked position.

The arm 50 is connected to a fork by a pin at the end of the connecting rod 60 and another fork on rod 60 connects with arm 61 of the lever 62 pivoted at 63 to the under side of the top plate. Lever 62 is guided in a slot 64 in the downwardly extending flange 25 of the top plate. The end of arm 61 carries a hook 65. A stiff tension spring 66 anchored at its ends to hook 65 and hook 67 in the flange 25 tends to pull the lever 62 into the position shown in Fig. 4 and to turn the shaft 33 clockwise in Figures 5, 6, 7, and 8.

It will be evident that if the tractor is drawing a semi-trailer and the fifth wheel and the king pin are in the position shown in Figure 5 and the driver wishes to disengage the semi-trailer he stops and draws the lever 62 clockwise in Fig. 4 stressing the spring and moving the spring actuated shaft 33 counter clockwise in Fig. 7 until the tooth 58 of lever 54 falls into position with face 53 holding the parts in the position shown in Fig. 7.

The driver remounts his cab, moves the fifth wheel forward as seen in Fig. 7 past the position shown in Fig. 8. The weight of the claw causes it to descend as the head of the king pin allows finger 42 to move toward the left in Fig. 8.

The finger 46 on the rocker arm engages finger 57 on lever 54 and disengages tooth 58 as shown in Fig. 8. The spring 66 is now free to rotate shaft 33 clockwise in Fig. 8 until the pawl bears against the convex surface 44 of the claw. The parts are now preset for engagement by another king pin and automatic locking.

Considering the fifth wheel moving to the left in Fig. 8, the king pin will engage finger 42, the claw 43 will rise into position as shown in Figure 5 and the stressed spring 66 now has the opportunity to swing the pawl and shaft 33 clockwise as seen in Fig. 5 and the pawl moves under the rocker arm holding it in locked position.

The invention is not limited to the precise form here used for illustration and covers such embodiments as may suggest themselves to those skilled in the art.

I claim:

1. A cast fifth wheel plate having a horizontal flat top surface, a slot extending from one edge to the center of the plate, an integrally cast horizontal lip extending around the semi-circular end of the slot, a lock housing below the end of the slot integrally cast with said plate, parallel side walls in said housing, two horizontal studs supported in said walls, an arm pivoted on one stud, a pawl pivoted on the other stud and adapted to be moved into the path of said arm to hold it in its elevated position.

2. A cast fifth wheel plate having a horizontal flat top surface, a slot extending from one edge to the center of the plate, an integrally cast horizontal lip extending around the semi-circular end of the slot, a lock housing below the end of the slot integrally cast with said plate, parallel side walls in said housing, two horizontal studs supported in said walls, a sole plate adapted to slide on the face plate, a circular king pin extending downwardly from said sole plate and having an enlarged head adapted to pass along said slot and under said lip, locking mechanism supported on said studs including a claw pivoted on one of said studs which is adapted to move vertically after the head of the king pin has passed under said lip to engage the rear part of the head and a pawl pivoted on the other horizontal stud and adapted to be moved into the path of the claw to hold the king pin in lip-engaging position.

3. A fifth wheel coupling comprising a downwardly projecting king pin attached to a semi-trailer, a cast plate supported on a tractor, a pocket having parallel sides cast on the under side of said plate, a slot in the plate leading the king pin into the pocket when coupling, an arm hinged in the pocket below the king pin and adapted to swing upward behind the king pin, a pawl hinged in the pocket adapted to fall under said arm when said arm has been elevated to prevent the king pin passing out of the pocket.

4. A fifth wheel coupling comprising a downwardly projecting king pin attached to a semi-trailer, a head on the king pin having an enlarged diameter, a horizontal cast plate supported on a tractor, a pocket having parallel sides cast on the under side of said plate, a slot in the plate leading the king pin into the pocket when coupling, a horizontally projecting lip on the plate under which the head of said king pin projects when it has reached the end of the slot, an arm hinged in the pocket below the king pin and adapted to swing upward behind the king pin, a pawl hinged in the pocket adapted to fall under said arm when the arm has been elevated to lock the king pin in the pocket.

5. A fifth wheel coupling comprising a king pin downwardly projecting from a sole plate attached to a semi-trailer, a cast plate supporting said sole plate, a pocket having parallel sides cast on the under side of said plate, a slot in the plate leading the king pin into the pocket when coupling, a rocker arm hinged in the pocket in such a manner that the king pin entering the slot passes over the rear end of the rocker arm but engages the forward end of the rocker arm to swing the rear end of the rocker arm upward behind the king pin, a pawl hinged in the pocket adapted to fall under said rocker arm when the rear end has been elevated thereby preventing the king pin from passing out of the pocket.

6. A fifth wheel coupling comprising a king pin projecting downward from a sole plate attached to a semi-trailer, a cast plate supporting said sole plate, a pocket having parallel sides cast on the under side of said sole plate, a slot in the plate leading the king pin into the pocket when coupling, a rocker arm hinged in the pocket in a manner that permits the king pin entering the pocket to pass over the rear end of the rocker arm but engage the front end of the rocker arm to swing the rear end of the rocker arm up behind the king pin, a pawl hinged in the pocket, a spring tending to draw the pawl under the elevated rear end of said rocker arm, manual means for moving the pawl against the spring out from under the rocker arm, a latch holding the pawl out from under the rocker arm when the pawl has been thus moved manually.

7. A fifth wheel coupling comprising a king pin projecting downward from a sole plate attached to a semi-trailer, a cast plate supporting said sole plate, a pocket having parallel sides cast on the under side of said sole plate, a slot in the plate leading the king pin into the pocket when coupling, a rocker arm hinged in the pocket in a manner that permits the king pin entering the pocket to pass over the rear end of the rocker arm but engage the front end of the rocker arm to swing the rear end of the rocker arm up behind the king pin, a pawl hinged in the pocket, a spring tending to draw the pawl under the elevated rear end of said rocker arm, manual means for moving the pawl against the spring out from under the rocker arm, a latch holding the pawl out from under the rocker arm when the pawl has been thus moved manually, means for disengaging said latch by the dropping of the rear end of the rocker arm when the king pin moving out of the slot has lost contact with the forward end of the rocker arm.

8. A fifth wheel coupling comprising a downwardly projecting king pin attached to a semi-trailer, a horizontal shaft supported on a tractor to extend crosswise thereon, a cast plate pivotally supported on said horizontal shaft, a pocket having parallel sides cast on the under side of said plate, a slot in the plate leading the king pin into the pocket when coupling an arm hinged in the pocket adapted to swing upward behind the king pin, a shaft extending through the walls of the pocket, a pawl within the pocket keyed to said shaft and adapted to be swung under the arm when it is elevated, a lever outside the pocket keyed to said shaft, spring means attached to the under side of said plate tending to swing said pawl under the arm, manually operable means for moving said pawl into disengaged position against said spring.

9. A fifth wheel coupling comprising a downwardly projecting king pin attached to a semi-trailer, a horizontal shaft supported on a tractor to extend crosswise thereon, a cast plate pivotally supported on said horizontal shaft, a pocket having parallel sides cast on the under side of said plate, a slot in the plate leading the king pin into the pocket when coupling, an arm hinged in the pocket adapted to swing upward behind the king pin, a shaft extending thru the walls of the pocket, a pawl within the pocket keyed to said shaft and adapted to be swung under the arm when it is elevated, a lever outside the pocket keyed to said shaft, spring means attached to the under side of said plate tending to swing said pawl under the arm, manually operable means for moving said pawl into disengaged position against said spring, a lever pivoted on the outside wall of the pocket, a surface movable with said shaft engaging said lever to prevent the spring from drawing the pawl back under the arm after manual disengagement.

10. A fifth wheel coupling comprising a downwardly projecting king pin attached to a semi-trailer, a horizontal shaft supported on a tractor to extend crosswise thereon, a cast plate pivotally supported on said horizontal shaft, a pocket having parallel sides cast on the under side of said plate, a slot in the plate leading the king pin into the pocket when coupling, an arm hinged in the pocket adapted to swing upward behind the king pin, a shaft extending through the walls of the pocket, a pawl within the pocket keyed to said shaft and adapted to be swung under the arm when it is elevated, a lever outside the pocket keyed to said shaft, spring means attached to the under side of said plate tending to swing said pawl under the arm, manually operable means for moving said pawl into disengaged position against said spring, a lever pivoted on the outside wall of the pocket, a surface movable with said shaft engaging said lever to prevent the spring from drawing the pawl back under the arm after manual disengagement, a slot in the wall of the pocket, means passing through the slot whereby the rocker arm when tilted as the king pin is disengaged may engage the lever to release the engagement of the lever with the shaft.

11. A casting having a flat face and a pocket having parallel walls on its under side, reinforcing ribs on the under side of the casting radiating out from said pocket, two parallel shafts extending through both walls of the pocket, a rocker arm having upstanding ends free to rock on one shaft, a pawl on the other shaft that can swing in under one end of the rocker arm when that end has been elevated preventing the rocker arm from rocking backward.

12. A casting having a flat face and a pocket having parallel walls on its under side, a slot extending through the face from one edge of the casting to a point over the pocket, two parallel shafts extending through both walls of the pocket, a rocker arm having upstanding ends free to rock on one shaft, a trailer plate supported on the cast plate, a king pin extending down from the plate adapted to slide along the slot, the forward end of the king pin passing over one end of the rocker arm and engaging the other end of the rocker arm to rock the first named end upward behind the king pin, a pawl on the other shaft that can swing in under one arm of the rocker arm when that arm has been elevated preventing the rocker arm from rocking backward and to free the king pin.

13. A fifth wheel casting having a slot, parallel walls extending down from the plate, a king pin having a neck and a head, a flange on the end of the slot engaging the neck of the king pin to prevent the king pin from rising out of the slot, pins extending through the walls and located below the path of the king pin, a movable claw supported on one of said pins which is raised to engage the rear side of the head of the king pin by the movement of the king pin into said slot, and a pawl supported on the other one of said pins adapted to fall into position under the claw as it is elevated to form a strut transmitting the drawbar pull from the casting thru the flange and said last named pin and the pawl and a portion of the claw to the head of the king pin.

14. A fifth wheel casting having a slot, parallel walls extending down from the plate, a king pin having a neck and a head, a flange on the end of the slot engaging the neck of the king pin to prevent the king pin from rising out of the slot, two pins extending thru the wall and located below the path of the king pin, movable parts supported on said side wall raised by the movement of the king pin into position to engage the rear of the head of the king pin and forming a strut transmitting the draw bar pull from the casting thru the flange and the parts forming the strut to the head of the king pin, said movable parts comprising a rocker arm pivoted on one pin and rocked by the king pin entering the slot into a position where it forms part of the strut which engages the head of the king pin, and a pawl swinging on the other pin and having a convex surface fitting into a concave portion of the under side of the elevated rocker arm to form the balance of the strut.

RAY A. BRAUNBERGER.

REFERENCES CITED

The following references are of record in the file of this patent:

UNITED STATES PATENTS

| Number | Name | Date |
| --- | --- | --- |
| 1,968,623 | Swift | July 31, 1934 |
| 2,096,282 | Kortering | Oct. 19, 1937 |
| 2,306,459 | Mennen | Dec. 29, 1942 |
| 2,336,939 | Kinne | Dec. 14, 1943 |
| 2,431,779 | Stevens | Dec. 2, 1947 |
| 2,438,323 | Miller | Mar. 23, 1948 |
| 2,456,826 | Fontaine et al. | Dec. 21, 1948 |
| 2,468,013 | Kayler | Apr. 19, 1949 |